United States Patent [19]
Hikita et al.

[11] Patent Number: 5,608,309
[45] Date of Patent: Mar. 4, 1997

[54] VEHICLE-USE ALTERNATING CURRENT GENERATOR CONTROL SYSTEM

[75] Inventors: Sakae Hikita, Katsuta; Yuuji Maeda, Hitachioota; Masakatsu Fujishita, Mito; Masahiro Sato, Katsuta; Seiichi Kawasaki, Tokai; Takayuki Ebisawa, Mito, all of Japan

[73] Assignee: Hitachi, Ltd., Japan

[21] Appl. No.: 200,967

[22] Filed: Feb. 24, 1994

[30] Foreign Application Priority Data

Feb. 24, 1993 [JP] Japan .................................. 5-035166

[51] Int. Cl.⁶ ......................................................... H02P 9/10
[52] U.S. Cl. ................................ 322/28; 322/36; 320/64; 320/30
[58] Field of Search ............................... 322/17, 25, 28, 322/58, 40

[56] References Cited

U.S. PATENT DOCUMENTS

| | | | |
|---|---|---|---|
| 4,308,492 | 12/1981 | Mori et al. | 320/32 |
| 4,651,081 | 3/1987 | Nashimura et al. | 320/64 |
| 5,122,723 | 6/1992 | Sato | 320/64 |
| 5,231,344 | 7/1993 | Marumoto et al. | 322/14 |
| 5,444,354 | 8/1995 | Takahashi et al. | 322/28 |

FOREIGN PATENT DOCUMENTS

| | | |
|---|---|---|
| 0096867 | 12/1983 | European Pat. Off. . |
| 4113732 | 11/1991 | Germany . |

OTHER PUBLICATIONS

English translation of German Office Action dated Jun. 19, 1995.

*Primary Examiner*—Thomas M. Dougherty
*Assistant Examiner*—Nicholas Ponomarenko
*Attorney, Agent, or Firm*—Evenson, McKeown, Edwards & Lenahan P.L.L.C.

[57] ABSTRACT

A vehicle alternating-current generator control system comprising a voltage command unit for variably controlling a reference voltage according to the state of an internal combustion engine, and an arithmetic unit for storing the difference between a target generation voltage commanded by the voltage command unit and a battery voltage detected by a voltage detection circuit and adding a voltage corresponding to the voltage difference to a command voltage generated by the voltage command unit.

26 Claims, 11 Drawing Sheets

VEHICLE-USE ALTERNATING CURRENT GENERATOR CONTROL SYSTEM

BACKGROUND OF THE INVENTION

The present invention relates to a charging system for an internal combustion engine of a vehicle, particularly to an alternating current (a.c.) generator control system for a vehicle generator driven by the internal combustion engine to generate electric power.

Conventional a.c. generators driven by an internal combustion engine of an automobile are commonly controlled by a controller called an IC regulator, which detects and controls the voltage of a vehicle battery charged by the generator. Japanese Patent Laid-Open No. 161195/1985 discloses a vehicle alternating current generator controller which uses a microcomputer to systematically and smoothly control electric-power generation according not only to the state of vehicle battery, but also the states of the engine and the electric load. The controller receives a signal indicative of an operating parameter of the internal combustion engine, such as from a sensor for detecting a turned-on air conditioner or headlamp, to detect the state of operation or electric load, and voltages generated by the generator are switched in response to the vehicle operational state or electric load state.

For the above generator controller according to the prior art, it is possible to achieve smoother control of generator operation by taking into account an operational state of the vehicle, or its electric-load state. However, even though this prior art system can achieve adequate fuel efficiency and power performance, it does not maintain stable operation because target or command voltages are determined only by the controller itself, and no correction is made.

SUMMARY OF THE INVENTION

It is an object of the present invention to provide an a.c. generator control system for a vehicle, which stabilizes the power performance and fuel efficiency of an internal combustion engine by correcting a command value generated by the microcomputer in response to an operating state of the vehicle or of an electric-load thereof.

This and other objects and advantages are achieved by the vehicle alternating-current generator control system according to the present invention, which comprises an electricity storage device (such as a storage battery) charged by the generator, a sensor for detecting the voltage of the electricity storage device, a unit for detecting the state of an electric load mounted on the vehicle, and an engine control unit which generates a command voltage based on operating parameters of the vehicle or the electric load. The command voltage value is stabilized by correcting it in response to a difference signal indicative of a difference between the command voltage and the actual battery voltage output.

Other objects, advantages and novel features of the present invention will become apparent from the following detailed description of the invention when considered in conjunction with the accompanying drawings.

DETAILED DESCRIPTION OF THE DRAWINGS

Figure 1:
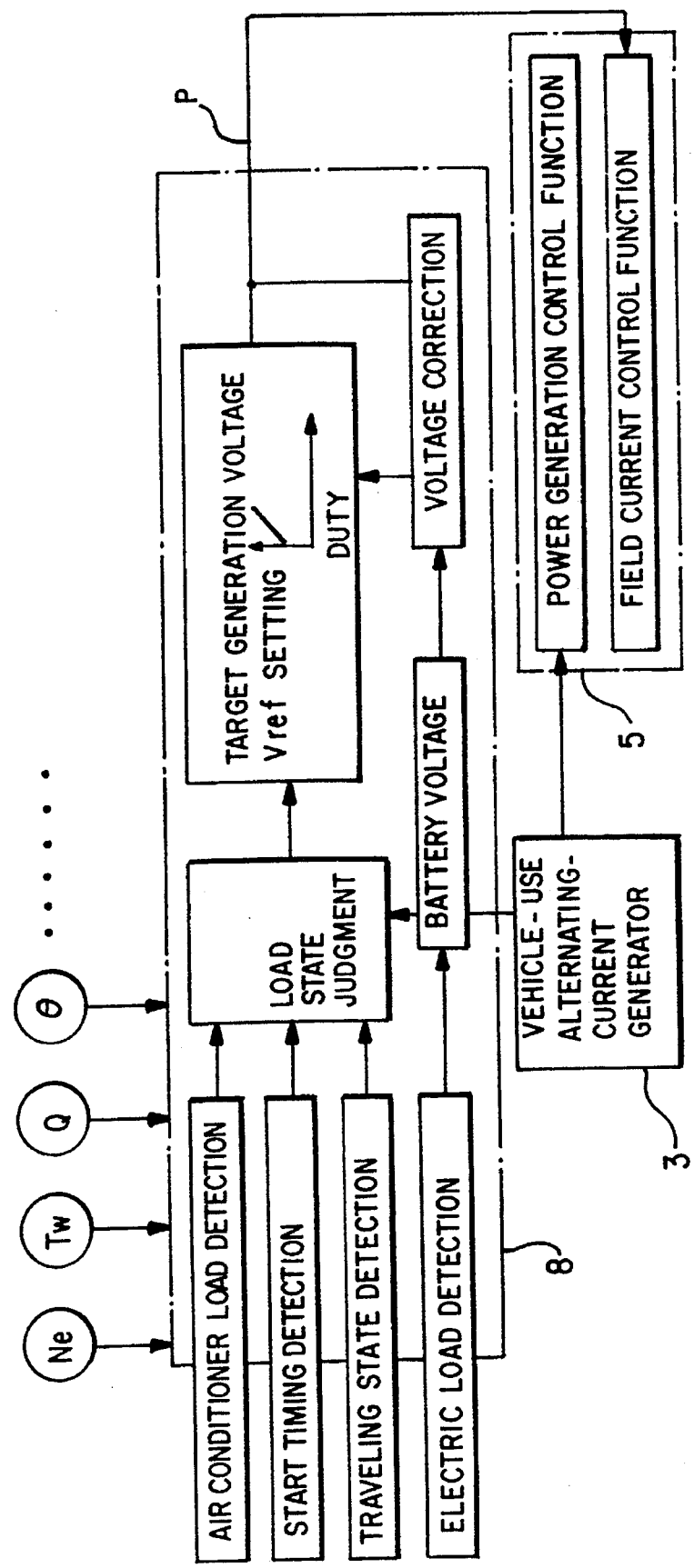
FIG. 1 is a conceptual schematic diagram of the vehicle a.c. generator control system of the present invention.
Figure 7:
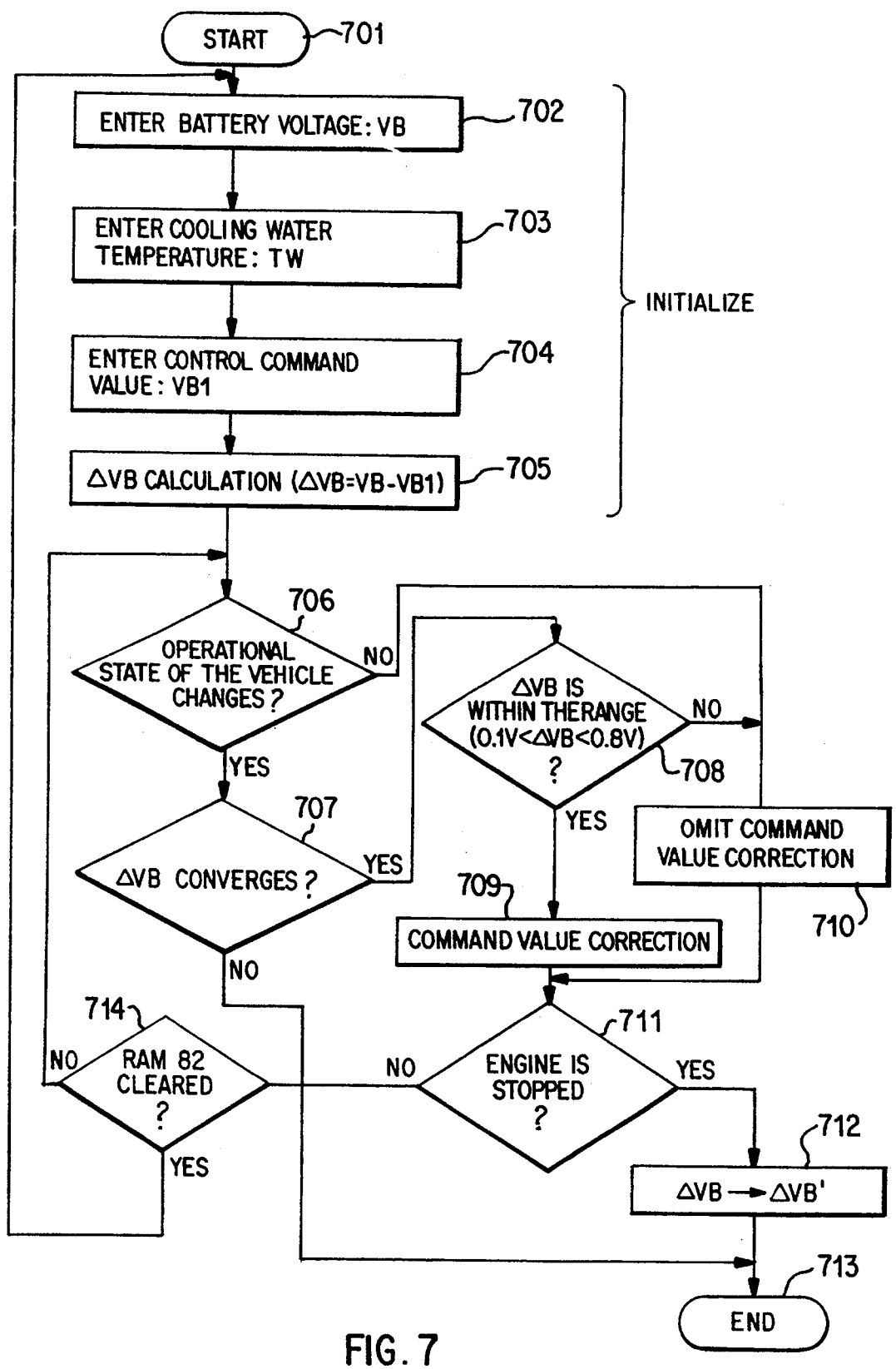
FIG. 7 is a flow chart which illustrates voltage correction according to the present invention.

FIG. 1 shows an embodiment of the vehicle a.c. generator control system of the present invention, in which an internal combustion engine control unit 8 receives data concerning engine speed, engine water temperature, throttle opening, and engine intake air flow, and based on these conditions, detects an air conditioner load, time of engine start, vehicle traveling state, and electric load, to determine the vehicle load and operating state. The control unit 8 then sets a command output voltage value VB1 of a generator 3 which is optimum for the vehicle state. By performing these arithmetic calculations in the internal combustion engine control unit 8 and outputting a control signal P (corresponding to the command voltage VB1) to a field current control unit 5, the battery voltage is controlled to follow the command voltage in the a.c. generator 3. According to the invention, a correction value ΔVB is determined from the difference between the battery voltage and target generation voltage (as represented by the control signal P), and is used to correct the control signal. As shown in FIG. 7, the correction value is determined by subtraction of the battery voltage VB and the target voltage VB1, or in another embodiment a ratio is utilized. In still other embodiments, the correction value is determined according to other algorithms. The value of ΔVB thus determined is then used to correct the command voltage VB (and hence the control signal P).

Figure 2:
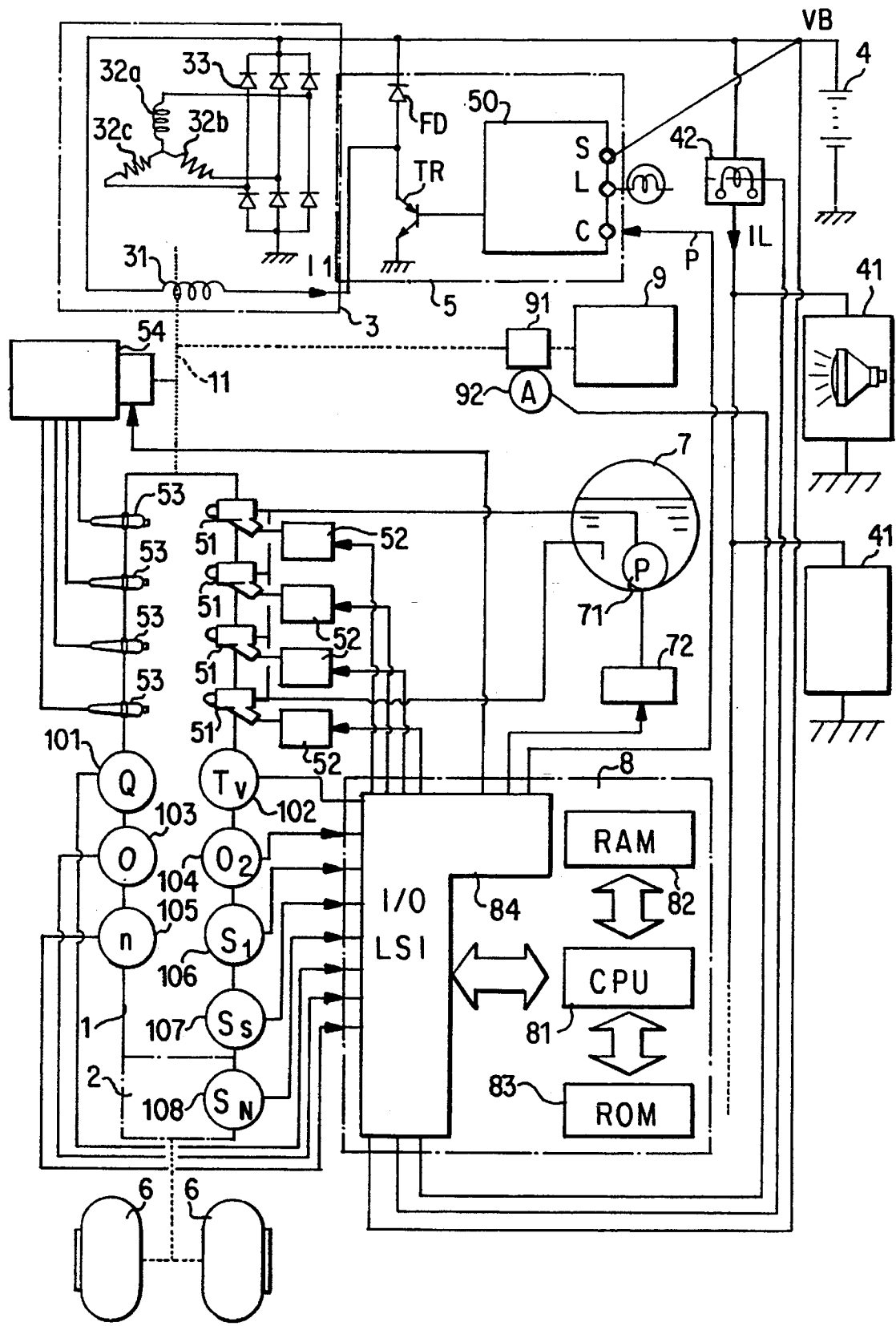
FIG. 2 is a block diagram of the entire system of the present invention.

FIG. 2 is a more detailed schematic diagram of the a.c. generator control system of the present invention, in which an internal combustion engine 1 mounted on a vehicle (such as an automobile) has a crank-shaft 11 for outputting a rotational torque. An a.c. generator 3 is mechanically connected to the crankshaft 11 through a pulley and belt (not shown). Similarly to a conventional generator, the a.c. generator 3 comprises a rotor having a field winding 31 on its outer periphery, and a stator having three-phase windings 32a, 32b and 32c facing the outer periphery of the rotor. The rotor is driven synchronously with the crankshaft of the internal combustion engine 1. A rectifying circuit 33, having for example six series parallel-connected diodes is connected to the three-phase windings 32a, 32b, and 32c so as to rectify the three-phase alternating-current output of the generator 3 and supply the output to vehicle battery 4 to charge it. The generator 3 is locally provided with a conventional power generation controller 50 for regulating output voltage based on the voltage of the battery 4.

The rotational torque of the internal combustion engine 1 is transmitted in a conventional manner to a driving wheel 6 through a transmission 2. The internal combustion engine 1 is a 4-cylinder MPI (multiple-port fuel injection) engine, which is provided with four injectors 51 and their driving arrangements 52 which control the quantity of fuel to be supplied to each cylinder, as well as a spark plug 53 for each cylinder. The spark plugs generate sparks in response to a high voltage applied from a distributor 54 to explode the fuel compressed in each cylinder. The operation of the injectors 51 and the spark plugs 53 is controlled by a so-called engine control unit (ECU) serving as the controller of the internal combustion engine 1. Furthermore, a fuel pump 71 set in a fuel tank 7, supplies pressurized fuel to the injectors 51, and is also controlled by the ECU 8 through a fuel pump controller 72.

The ECU 8 comprises, for example, a microcomputer with a central processing unit (CPU) 81 for performing operations for various controls, a random access memory (RAM) 82 for temporarily storing various data values used for operations, and a read only memory (ROM) 83 storing data necessary for programs and operations. Separately from the computer, the internal combustion engine 1 uses an input/output hybrid integrated circuit (I/O LSI) 84, which stores various parameters and data necessary for controlling the internal combustion engine 1 in the microcomputer. It also includes an A-D converter for converting an analog signal of, for example, a battery voltage VB into a digital signal. The I/O LSI 84 generates control signals for driving and controlling various actuators according to operation results of the microcomputer.

To detect parameters and data of the internal combustion engine necessary for control by the ECU 8, the following are used: an air flow meter for detecting the air quantity Q input into an internal combustion engine (e.g. hot-wire air flow sensor) 101, a water temperature sensor 102 for detecting the water temperature TW of cooling water, a throttle sensor 103 for detecting the opening θ of a throttle valve, an $O_2$ sensor 104 for detecting the oxygen concentration $O_2$ in exhaust gas and controlling the air-fuel ratio (A/F) of supplied fuel, a crank angle sensor 105 for generating the pulse output "n" for each predetermined rotation angle (e.g. 1 degree) of the crankshaft 11 in order to detect the speed or rotation angle of the internal combustion engine, an idle switch 106 for detecting the idle state SI of the engine from, for example, the depression angle of an accelerator pedal or the angle of a throttle valve, and a starter switch 107 for detecting the operation of a starter for the engine. Moreover, the transmission 2 is provided with a neutral switch 108 for detecting whether it is in the neutral state SN.

A current sensor 42 determines the battery voltage VB of the battery 4 and the load current IL supplied to, for example, an electric load 41 of a headlamp and provides an output signal to the ECU 8, in addition to the above various operation parameters and data of the internal combustion engine. The current sensor 42 may be for example, a Hall element. Finally, the output signal A of a load switch 92 for an electromagnetic clutch 91 which engages and disengages a compressor 9 of a vehicle air conditioner with the crankshaft 11 is also input to the ECU 8, to detect the operation of the air conditioner.

The power generation controller 5 controls the field current IF and the power output of the generator 3 by detecting the output voltage VB of the battery 4 and comparing it with a predetermined reference value. As is the case with the prior art, the ECU 8 performs predetermined operations based on internal combustion engine parameters from the above sensors and switches, controls various actuators according to the operation results, and controls the operation of the internal combustion engine.

According to the present invention, the ECU 8 controls not only the operation of the internal combustion engine 1 but also the operation of the generator 3. That is, the control signal P output from the I/O LSI 84 of the ECU 8 is provided to a control circuit 50 of power generation controller 5, the details of which are shown in FIG. 3.

Figure 3:
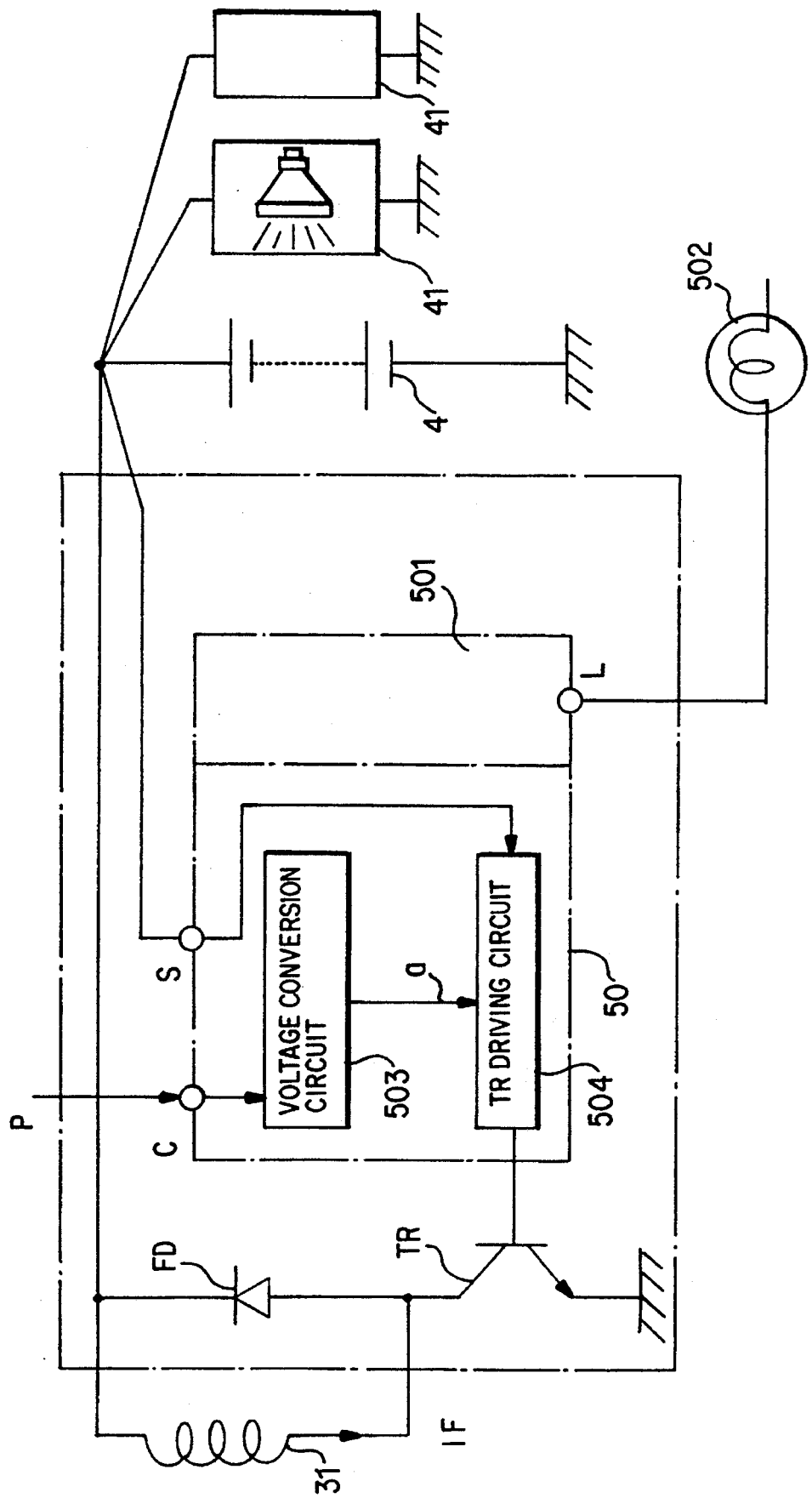
FIG. 3 is a conceptual block diagram of a portion of the generator control system of the present invention.

Referring to FIG. 3, a TR driving circuit 504, which may be a control circuit of a conventional generator, is used as a main control loop. When the control signal P is received from terminal C, a signal "a" is output from a voltage conversion circuit 503 to control the TR driving circuit 504, where it is compared with battery voltage VB to drive transistor TR. As is the case with the prior art, the voltage generated by the generator is controlled by detecting a voltage from a terminal S, in the absence of a signal from the terminal C. Moreover, an alarm circuit 501 drives a warning lamp 502 through a terminal L.

Figure 4:
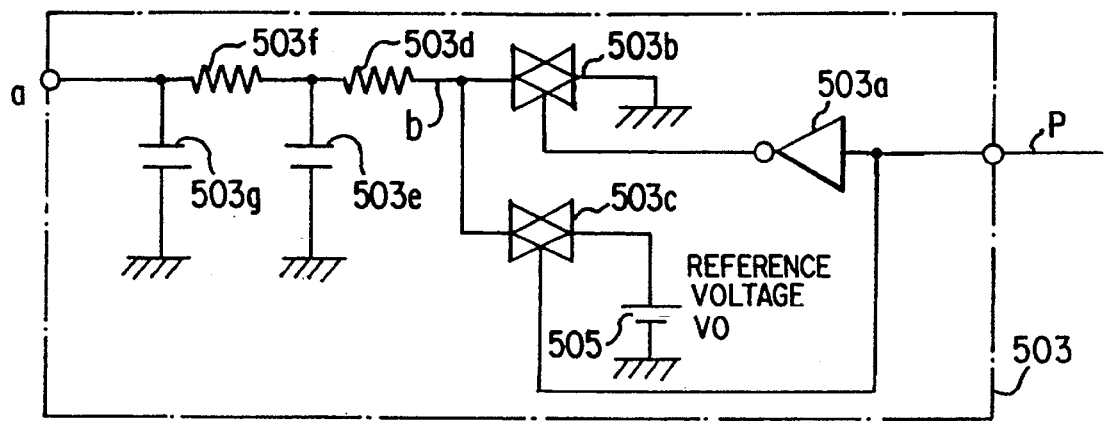
FIG. 4 is a block diagram of a voltage conversion circuit.
Figure 5:
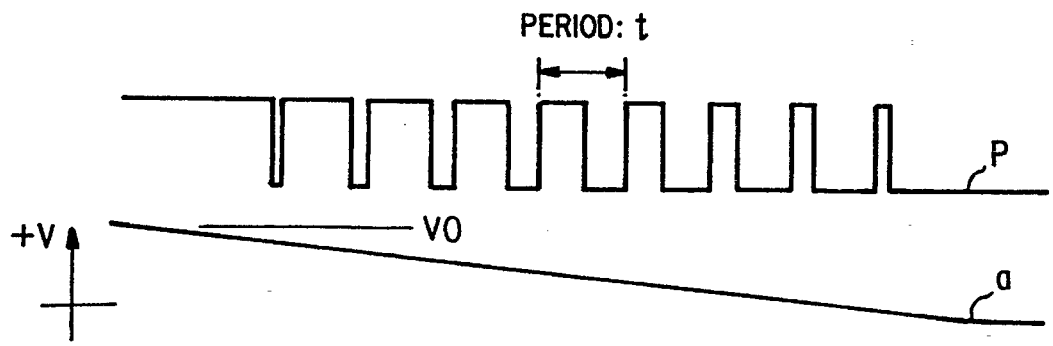
FIG. 5 is a graph which illustrates the operation of the voltage conversion circuit.

The operation of the voltage conversion circuit 503 is described below by referring to FIGS. 4 and 5. FIG. 4 shows a block diagram of the voltage conversion circuit 503. In FIG. 4, symbol 503a is a NOT gate, 503b and 503c are analog switches comprising a C-MOS transfer gate, 503d and 503f are resistors, 503e and 503g are secondary filters using a capacitor. If input signal P is at a Hi level, the analog switch 503c is turned on, the analog switch 503b is turned off, and signal "b" takes on a reference voltage value (from battery 505) V0 (e.g. 2.4 V). If the input signal P is at Low level, switch 503b is turned on, switch 503c is turned off, and the signal "b" is grounded. Thus, when the input signal P alternates between Hi and Low, the signal "b" alternates between V0 (e.g. 2.4 V) and 0 V. As shown in FIG. 5, when the control signal P with a cycle "t" (e.g. 6.4 ms) passes through the voltage conversion circuit 503, the signal "b" is generated and passed through the secondary filter, resulting in an output signal "a". (In this case, the control signal P has a duty signal with a constant frequency.) As shown in FIG. 3, the signal a is applied to the TR driving circuit 504, and thus controls charging of the battery 4.

Figure 6:
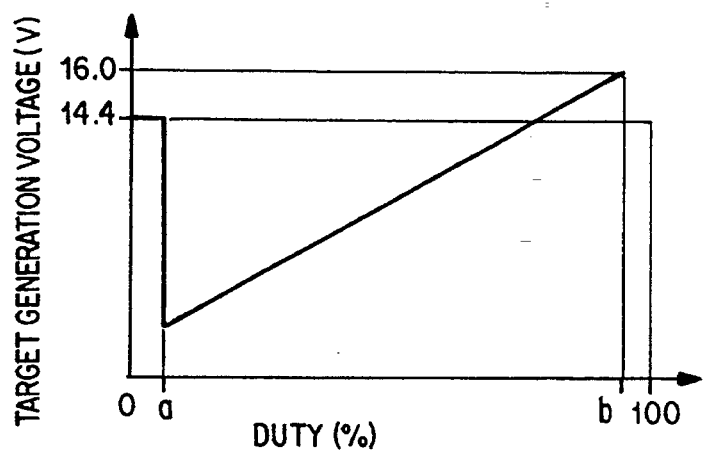
FIG. 6 is a graph which illustrates the relationship between a control signal and target generation voltage.

FIG. 6 shows the relationship between the duty cycle of the control signal P computed by the ECU 8 based on the operational state of the internal combustion engine and the target generation voltage of the generator. In FIG. 6, the range from "a", as a lower limit to "b" as an upper limit, constitutes an effective control range, within which signals can be controlled to the target generation voltage. Within the effective control range the target generation voltage is proportional to the duty cycle of the control signal P. The upper and lower limits of the effective range of the control signal P are provided to prevent unstable operations due to mixture of signals (noise).

An embodiment of the present invention will be described below by reference to the flow chart in FIG. 7. When a generator control task starts in the step 701, the vehicle battery voltage VB is input in the step 702, the cooling-water temperature TW of the internal combustion engine is input in the step 703, and a control command value VB1 corresponding to the target generation voltage command value P is selected in step 704 according to the vehicle operational state in a manner described later. (See FIG. 8.) The difference ΔVB (=VB−VB1) between the control command value VB1 and the voltage VB of the vehicle battery is then calculated in the step 705.

In the step 706, it is determined whether the operational state of the vehicle changes. If not, correction of the voltage difference is omitted in the step 710. If, on the other hand, the operational state of the vehicle has changed, a further determination is made in the step 707 whether the voltage difference ΔVB calculated in the 705 has converged. If not, control is stopped in the step 713. When it is judged that the voltage, difference ΔVB has converged, it is judged in step 708 whether it is within the range to be corrected (in this embodiment, for example, 0.1 V<ΔVB<0.8 V). If so, the voltage difference ΔVB is corrected in the step 709. The correcting process is omitted, however, (step 710) when the value of ΔVB is not within the correction range.

The correction process of step 709 is performed as follows. First, a new value for the voltage difference ΔVB is calculated, using the voltage difference ΔVB(OLD) obtained in the preceding iteration:

$$\Delta VB = \Delta VB\,(OLD) + (\alpha \cdot \Delta VB\,(OLD)), \;(\alpha = \tfrac{1}{10}, \text{for example}).$$

(Note that the voltage difference ΔVB may be a positive or negative quantity, depending on the relative magnitude of the control command value VB1 and the battery voltage VB.) The control command value VB1 is then corrected by adding to it the calculated ΔVB.

After the correcting step 709 (or after it is skipped in step 710), it is judged whether the internal combustion engine 1 is operating in the step 711. If so, and if (step 714) RAM 82 still contains the initializing values input in steps 702–705, the processing returns to the step 706. (If RAM 82 has been cleared, such as when the battery has been changed, processing returns to step 702.) If it is judged in the step 711 that the internal combustion engine is stopped, however, the voltage difference ΔVB is stored as ΔVB' in the random access memory 82 (step 712). The stored voltage difference ΔVB' is then held until the internal combustion engine is restarted, and processing ends at the step 713.

Figure 8:
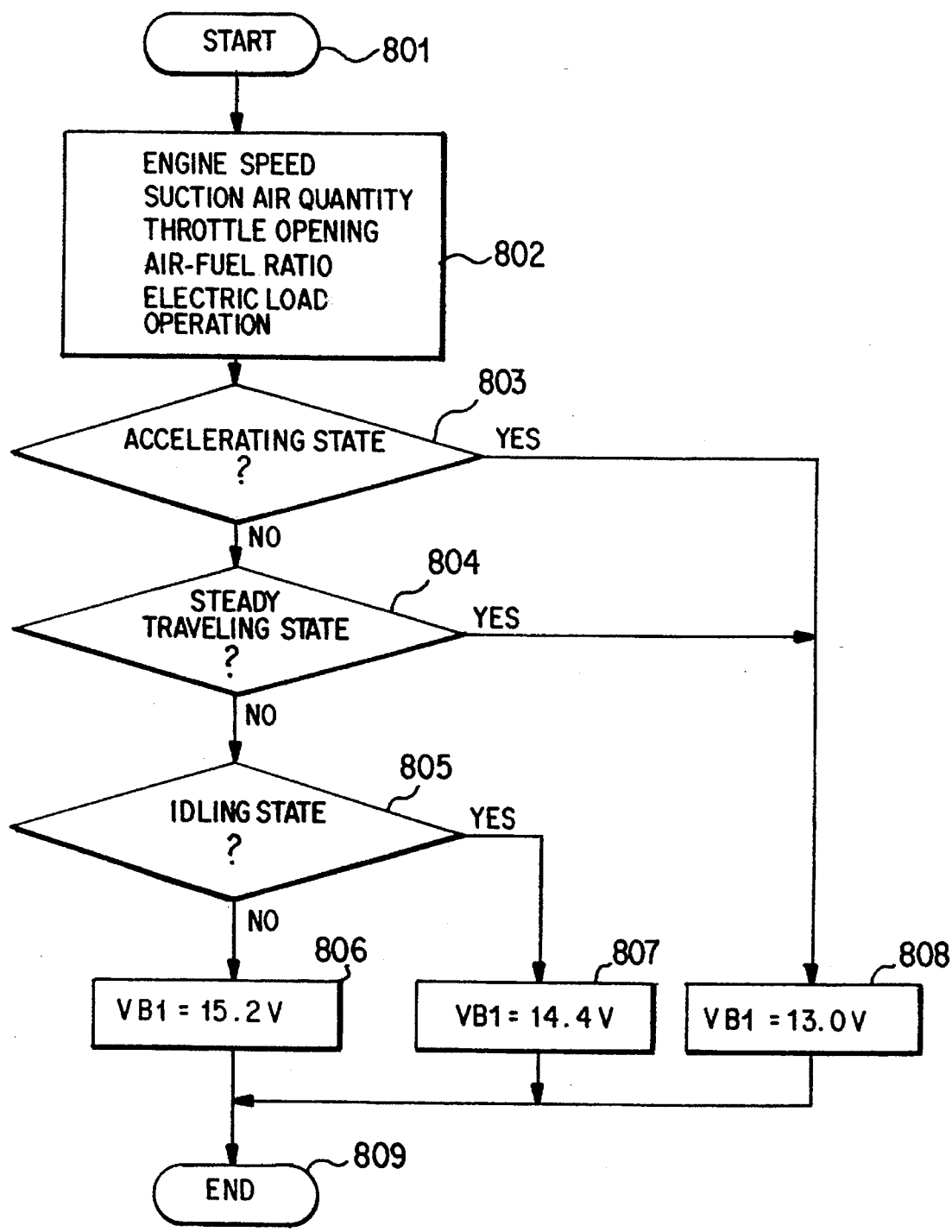
FIG. 8 is a flow chart which shows a portion of the processing for stable control for voltage correction.

A method of selecting the control command value VB1 in step 704 (above) is shown in the flow chart of FIG. 8. When a generator control task starts in the step 801, the operational state of the vehicle is judged according to the data for engine speed, suction air quantity, throttle opening, air-fuel ratio, and electric load operation, which data are input in the step 802. If it is determined that the vehicle is accelerating (step 803), or that it is travelling at a steady state (step 804), the control command value VB1 is also set in 13.0 V. If it is judged in the step 805 that the vehicle is idling, the control command value VB1 is set in 14.4 V; finally, if it is judged that the vehicle is in a state other than those mentioned above, the control command value VB1 is set in 15.2 V. (The above voltages are provided as examples. They may, of course, be varied within the scope of the invention to satisfy the operational requirements of the system in question.) Processing ends at the step 809.

The correction procedure performed in the step 709 is described below by reference to FIG. 9, which shows the voltage difference (ΔVB1, ΔVB2, etc.) between the battery voltage VB (solid line) and the control command value VB1 (dotted line). In this figure, the operating state of the vehicle is assumed to change at points a, b, c and d. Thus, the battery voltage VB and the control command value VB1 change at point "a" in FIG. 9 when the first change in the operating state occurs. However, because the control command value is corrected according to the preceding voltage difference ΔVB2 at point "b" (when the next change in the operating state of the vehicle is assumed to occur), the following relationship can be achieved:

$$\Delta VB2 > \Delta VB3.$$

Figure 9:
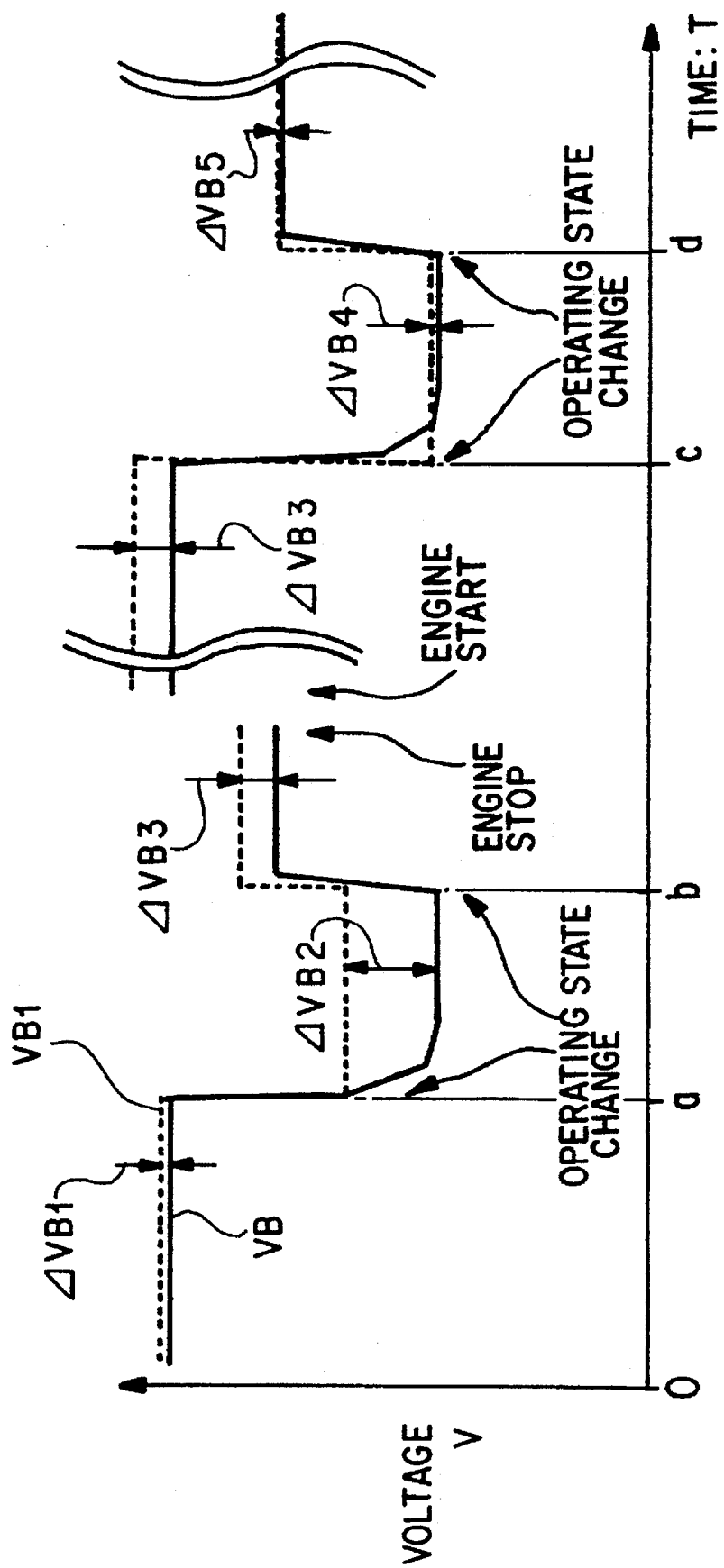
FIG. 9 is a graphic illustration of the operation of the control system.

In a case where the internal combustion engine is stopped, as shown in FIG. 9, it is possible to decrease the voltage difference by storing the voltage difference ΔVB3, and using it to correct the control command value when the engine is restarted. Furthermore, it should also be noted that when the vehicle is newly manufactured and is operated for the first time, or when a new battery is installed, the value of ΔVB will initially be large, and is decreased in the same manner as noted above.

In the above embodiment, the voltage difference is corrected according to changes of the vehicle's operational state. However, it is also possible to correct it at fixed intervals (for example, every two seconds) by use of the engine control unit 8 for controlling the operation of the internal combustion engine 1. Therefore, smoother control is realized by shortening the correction cycle.

Figure 10:
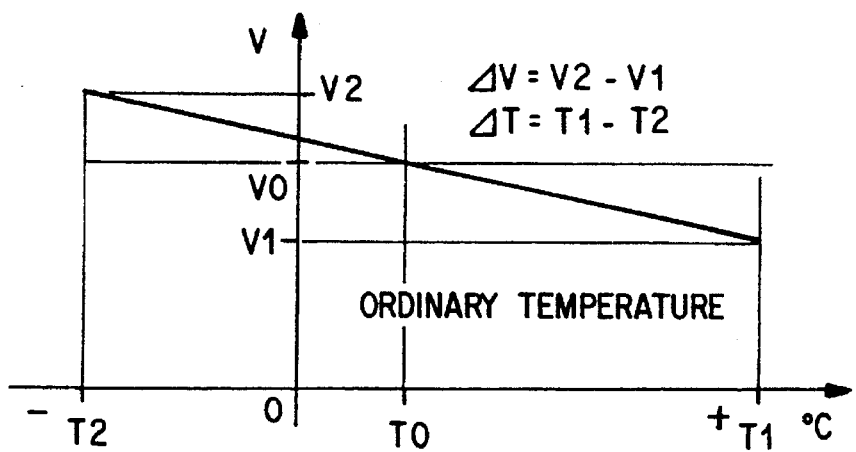
FIG. 10 is a temperature characteristic diagram of a reference voltage.
Figure 11:
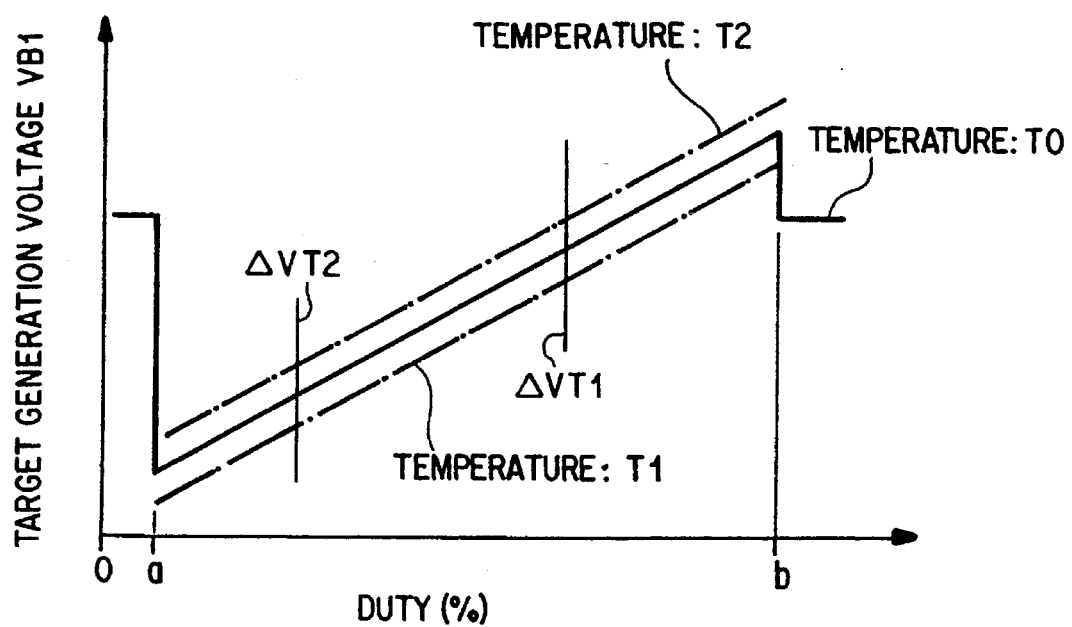
FIG. 11 is a graphic illustration of the relationship between the control signal and target generation voltage at various temperatures.

Another embodiment is described below by reference to FIGS. 10 and 11, in which it is assumed that the reference voltage V0 (FIG. 4) has a temperature characteristic as shown in FIG. 10, which in turn causes a drift in the magnitude of the signal "a" output by the voltage conversion circuit 503 (FIGS. 4 and 5), and alters the operation of Transistor TR in FIG. 3, which controls the flow of field current to the generator 3. It is possible, however, to correct the target generation voltage command value to compensate for the effect, by judging temperature conditions or the like in the internal combustion engine, because voltage is proportional to temperature T. That is, when the temperature increases to T1 in FIG. 10, the reference voltage utilized in the voltage conversion circuit 503 (FIG. 4) decreases from V0 to V1, and the magnitude of the target generation voltage decreases by an amount corresponding to ΔVT1. On the other hand, when the temperature falls to T2, the reference voltage rises from V0 to V2 and the target generation voltage rises by an amount corresponding to ΔVT2.

As described above, when a temperature characteristic occurs in the reference voltage, it is possible to calculate the fluctuation value of the target generation voltage, because the temperature characteristic is converted into a voltage by the duty cycle of the control signal P as shown in FIG. 5. Therefore, correction can be made by calculating the magnitude of the change in the reference voltage due to the temperature change of the target generation voltage, and adjusting the command value of the target generation voltage. It is also possible to use the temperature of the vehicle battery solution and that of the suction air as the means for judging the temperature state.

Figure 12:
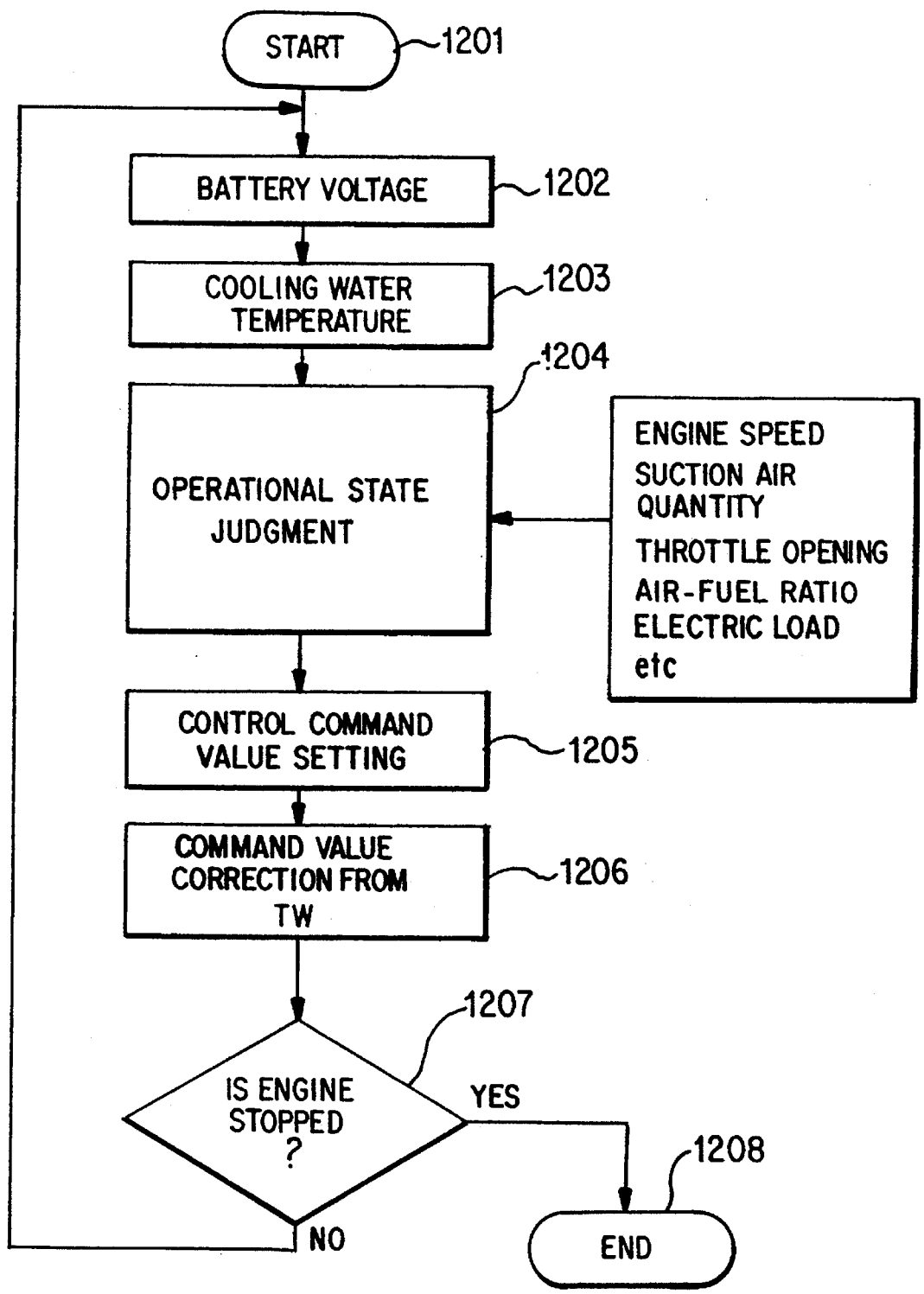
FIG. 12 is a flow chart which shows the operation of the control system for performing correction according to temperature.

FIG. 12 is a flow chart which shows an example of a control system that corrects the temperature characteristic described above. When a control task is started in the step 1201, the voltage VB of the vehicle battery is received in the step 1202, the cooling-water temperature TW in the internal combustion engine 1 is received in the step 1203, and the operational state the vehicle is judged in step 1204 according to the data for engine speed, suction air quantity, throttle opening, air-fuel ratio, and load operation. A voltage command value VB1 corresponding to the operational state is generated in the ECU 8 (step 1205). In this case, the operational state is judged as an accelerating state, decelerating state, or idling state according to, for example, the data for throttle opening and engine speed. (See FIG. 8.) After the control command value VB1 is selected, the temperature state of the reference voltage supply is determined from the cooling water temperature TW in the step 1206 and used to adjust the target generation voltage command value. A conversion constant $\beta$ is first used to convert TW to a temperature corresponding to reference voltage, from which a voltage drift value $\Delta$VT can be determined using the temperature characteristic curve of FIG. 5. Correction of the control command value VB1 is then performed by adding $\Delta$VT.

Next, it is determined whether the engine is stopped in step 1207. If not, step 1202 is repeated. However, when the engine is stopped, processing ends in the step 1208. This embodiment also realizes stable and smooth control by judging and correcting the temperature state when the reference voltage has a temperature characteristic.

Figure 13:
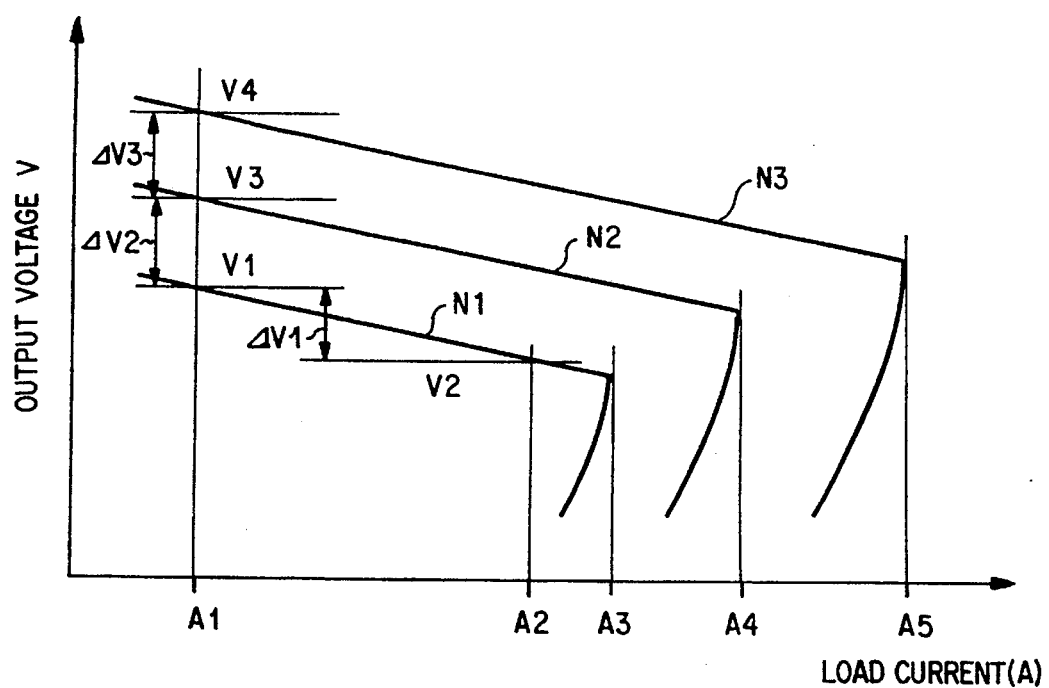
FIG. 13 shows a family of voltage-current characteristics for a generator to be controlled according to another embodiment of the invention.

Another embodiment of the invention will be described below by reference to FIG. 13. It is assumed in this embodiment that the generation voltage of a vehicle-use alternating current generator has a voltage-load current characteristic as shown in FIG. 13. Thus, when the rotating speed of the generator is N1 and the load current IL is A1, the generation voltage is V1. When the electric load of the vehicle increases to A2, the generation voltage decreases to V2, causing a voltage difference $\Delta$V1 relative to the previous state. Similarly, when the load current IL is A1 and the rotating speed of the generator changes from N1 to N2 and then N3, the generation voltage changes from V1 to V3 and then V4, causing voltage difference $\Delta$V2 and $\Delta$V3 relative to the previous state.

In this case, the target generation voltage command value VB1 can be corrected by calculating the magnitude of variations in the generation voltage based on the load current IL and the rotating speed using the engine control unit 8. The maximum value for the load current changes to A3, A4, A5 as the rotating speed of the vehicle-use alternating current generator changes N1, N2, N3. When the load current IL exceeds the maximum value, the generation voltage of the vehicle-use alternating current generator decreases further. Therefore, it is necessary to obtain the data on the maximum values of the load current IL corresponding to the rotating speed of the vehicle-use alternating current generator.

Figure 14:
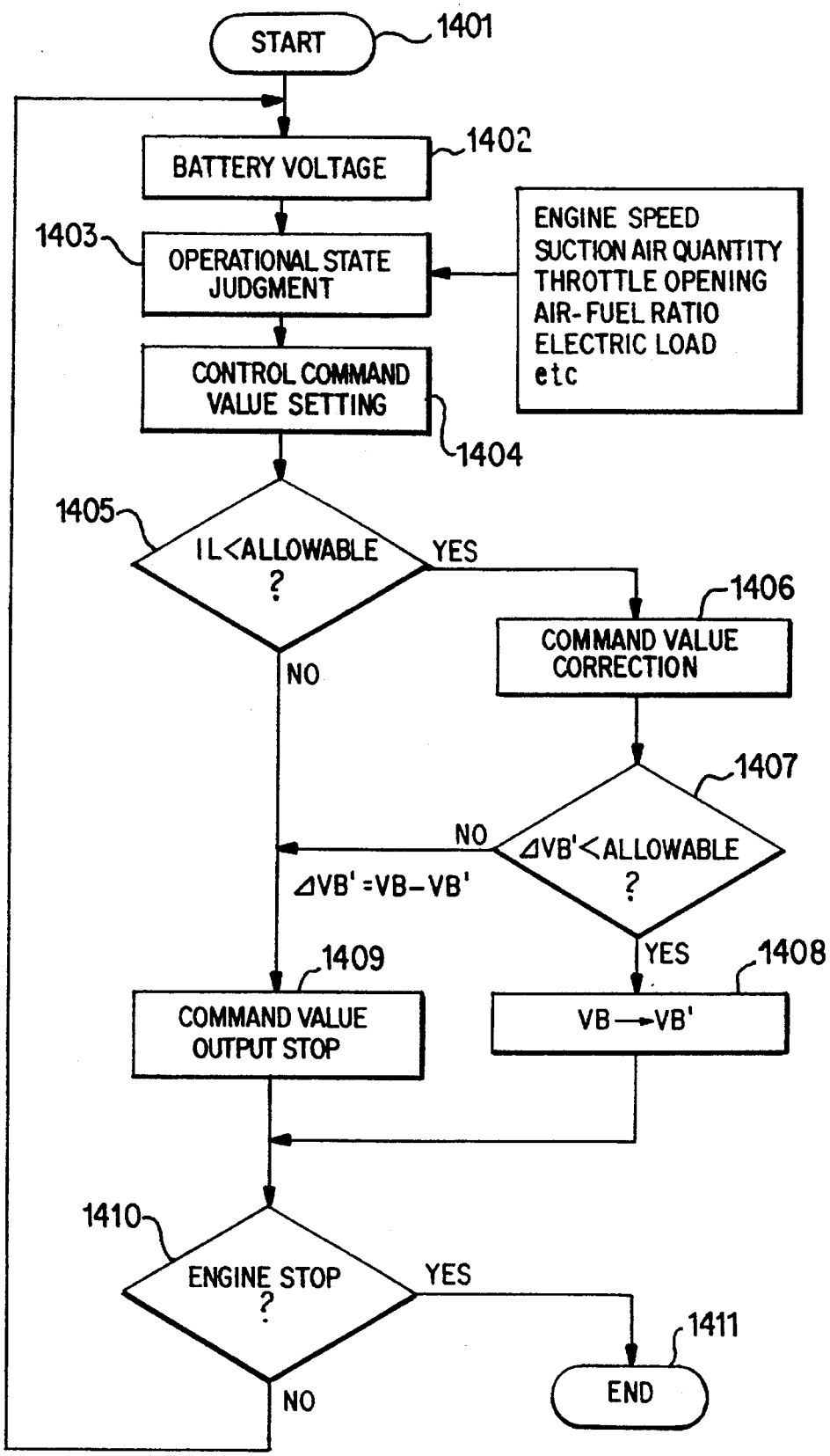
FIG. 14 is a flow chart which depicts the operation of the embodiment referred to in connection with FIG. 13.

An embodiment of a control system in which correction is executed using the voltage-load current characteristic of FIG. 13 is illustrated in the flow chart in FIG. 14, for a rotating speed of N1. When a control task is started in the step 1401, the voltage VB of the vehicle battery is read in the step 1402, and the operational state of the vehicle is judged in the step 1403 based on data for engine speed, suction air quantity, throttle opening, air-fuel ratio, and load operation. The voltage command value VB1 corresponding to the operational state is then generated (step 1404) in the ECU 8. In this case, the operational state is judged as accelerating, decelerating, or idling according to, for example, the data for throttle opening and engine speed. (See FIG. 8.) After the control command value VB1 is selected, the load current IL is calculated from the above data for the electric load operation and compared with the maximum value A3 for the load current IL in the step 1405. If the load current is larger than the maximum value A3, output of the control command value VB1 is stopped in step 1409.

On the other hand, if the load current IL is smaller than the maximum value A3 in the step 1405, the control command value VB1 is corrected by adding to it the voltage difference $\Delta$V1 corresponding to change in the load current IL in the step 1406.

Next, when the voltage difference $\Delta$VB' between the vehicle battery voltage VB and the voltage VB' stored in the memory 82 ($\Delta$VB'=VB–VB') is larger than a given allowable value (for example, 0.5 V), output of the control command value VB1 is stopped in step 1409 (since an abnormal condition exists). When the voltage difference $\Delta$VB' is smaller than the allowable value, the vehicle battery voltage VB is stored in the memory 82 as VB' in the step 1408. Then, it is determined whether the internal combustion engine 1 is stopped. If not, processing returns to the step 1402. If the engine is stopped, processing ends at the step 1411.

Although the description above assumes a generator rotating speed of N1, the same control can be performed in the case of changing speed, since the traveling state of the vehicle is judged using the engine rotating speed in the step 1403.

This embodiment realizes stable and smooth control by judging and correcting the load state corresponding to the characteristic of the vehicle-use alternating current generator. In this embodiment, control is performed using the voltage difference in the vehicle battery voltage VB changing with the load current IL and the rotating speed of the vehicle-use alternating current generator. However, it is also possible to perform such control using the voltage ratio in the battery voltage VB changing with the load current IL and the rotating speed of the vehicle-use alternating current generator.

The vehicle a.c. generator control system according to the invention makes it possible to continuously and stably obtain the power performance and fuel efficiency effect of an internal combustion engine by correcting a generation voltage command value according to an operational state with a control system for controlling the voltage generated by a vehicle generator.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for controlling an electric generator for charging a battery of a vehicle, said apparatus comprising:

means for sensing parameters indicative of respective operating states of said vehicle, of said battery, and of an electric load coupled to receive energy from said battery;

means for determining an operating state of said vehicle based on sensed operating parameters of said vehicles;

means for providing a plurality of control command voltage values corresponding to respective operating states of said vehicle;

a microcomputer for selecting one of said control command voltage values based on a determined operating state of said vehicle, and for generating a command voltage having said selected control command voltage value;

means for generating a target voltage for controlling an output voltage of said generator, said target voltage having a desired predetermined relationship to said command voltage;

means for switching an output voltage of said generator in response to said command voltage;

means for comparing said command voltage with an output voltage of said battery, and for generating a difference signal in response thereto; and means responsive to said difference signal, for correcting said command voltage to compensate for deviation of an actual relationship between said target voltage and said command voltage, relative to said desired predetermined relationship.

2. Apparatus according to claim 1 wherein said means for comparing comprises means for subtracting said command voltage from said output voltage of said battery to generate said difference signal.

3. Apparatus according to claim 1 wherein said means for comparing comprises means for computing a ratio of said command voltage value and said output voltage of said battery to generate said difference signal.

4. Apparatus according to claim 1 wherein said means for correcting comprises means for adding said difference signal to said command voltage.

5. Apparatus according to claim 2 wherein said means for correcting comprises means for adding said difference signal to said command voltage.

6. Apparatus according to claim 1 wherein said means for correcting comprises means for multiplying said command signal by said difference signal.

7. Apparatus according to claims 1 wherein said means for determining an operating state of said vehicle comprises:

means responsive to said operating parameters for detection of an acceleration state or a steady travelling state of said vehicle;

means responsive to said operating parameters for detecting an idling state of said vehicle; and means responsive to said operating parameters for detecting absence of said acceleration state, steady travelling state and idling state of said vehicle; and wherein said means for providing a plurality of control command voltage values generates a first control command voltage value corresponding to said acceleration or steady travelling state, a second control command voltage value corresponding to said idling state and a third control command voltage value corresponding to said absence.

8. Apparatus according to claim 7 wherein said third command voltage value is greater than said second command voltage value, which is greater than said first command voltage value.

9. Apparatus according to claim 1 further comprising:

means for detecting a change of operating state of said vehicle; and means for enabling said means for correcting only when an operating state of said vehicle has changed.

10. Apparatus according to claim 9 further comprising:

means for determining whether said difference signal falls within a valid correction range; and means for enabling said means for correcting only when said difference signal is within said valid correction range.

11. Apparatus according to claim 1 further comprising:

means for determining whether said difference signal converges; and means for interrupting output of said command voltage value when said difference signal does not converge.

12. Apparatus according to claim 9 further comprising:

means for determining whether said difference signal converges; and means for interrupting output of said command voltage value when said difference signal does not converge.

13. Apparatus according to claim 1 further comprising:

means responsive to said sensed operating parameters for determining when an engine of said vehicle is in a stopped state; and means for storing said difference signal in response to detection of a stopped state of said engine, for correcting said command voltage value when said engine is restarted.

14. Apparatus according to claim 11 further comprising:

means responsive to said sensed operating parameters for determining when an engine of said vehicle is in a stopped state; and means for storing said difference signal in response to detection of a stopped state of said engine, for correcting said command voltage value when said engine is restarted.

15. Apparatus according to claim 1 wherein said means for comparing further comprises:

means for adjusting said difference signal according to the formula $$\Delta VB = \Delta VB(OLD) + (\alpha \cdot \Delta VB\ (OLD))$$

wherein $\alpha$ is a constant having a value less than 1.0, $\Delta VB$ is the difference signal and $\Delta VB(OLD)$ is the difference signal generated in a previous iteration of said formula.

16. Method of controlling an electric generator for charging a battery of a vehicle, said method comprising the steps of:

sensing parameters indicative of respective operating states of said vehicle, of said battery, and of an electric load coupled to receive energy from said battery;

determining an operating state of said vehicle based on sensed operating parameters of said vehicles;

providing a plurality of control command voltage values corresponding to respective operating states of said vehicle;

selecting one of said command voltage values based on a determined operating state of said vehicle, and generating a command voltage having said selected control command voltage value;

generating a target voltage for controlling an output voltage of said generator, said target voltage having a desired predetermined relationship to said command voltage;

switching an output voltage of said generator in response to said command voltage;

comparing said command voltage with an output voltage of said battery, and generating a difference signal in response thereto; and correcting said command voltage based on said difference signal, to compensate for deviation of an actual relationship between said target voltage and said command voltage, relative to said desired predetermined relationship.

17. Method according to claim 16 wherein said comparing step comprises:

subtracting said command voltage value from said output voltage of said battery to generate said difference signal.

18. Method according to claim 16 wherein said comparing step comprises:

computing a ratio of said command voltage value and said output voltage of said battery to generate said difference signal.

19. Method according to claim 16 wherein said correcting step comprises:

adding said difference signal to said command voltage.

20. Method according to claim 16 wherein said correcting step comprises:

multiplying said command signal by said difference signal.

21. Method according to claim 16 further comprising:

detecting a change of operating state of said vehicle; and enabling said means for correcting only when an operating state of said vehicle has changed.

22. Method according to claim 21 further comprising the steps of:

determining whether said difference signal falls within a valid correction range; and enabling said means for correcting only when said difference signal is within said valid correction range.

23. Method according to claim 16 further comprising the steps of:

determining whether said difference signal converges; and interrupting output of said command voltage value when said difference signal does not converge.

24. Method according to claim 21 further comprising the steps of:

determining whether said difference signal converges; and interrupting output of said command voltage value when said difference signal does not converge.

25. Method according to claim 16 further comprising the steps of:

detecting when an engine of said vehicle stops operating; and storing said difference signal in response to detection of a stopping of said engine, for correcting said command voltage value when said engine is restarted.

26. Method according to claim 16 wherein said comparing step further comprises:

adjusting said difference signal according to the formula $$\Delta VB = \Delta VB(OLD) + (\alpha \cdot \Delta VB\ (OLD))$$

wherein $\alpha$ is a constant having a value less than 1.0, $\Delta VB$ is the difference signal and $\Delta VB(OLD)$ is the difference signal generated in a previous iteration of said formula.

* * * * *

UNITED STATES PATENT AND TRADEMARK OFFICE
CERTIFICATE OF CORRECTION

PATENT NO. : 5,608,309

DATED : March 4, 1997

INVENTOR(S) : Hikita et al.

It is certified that error appears in the above-identified patent and that said Letters Patent is hereby corrected as shown below:

On the title page, Item [73] Add the second Assignee:

Hitachi Automative Engineering Co., Ltd., Japan

Signed and Sealed this

Eleventh Day of November, 1997

*Attest:*

BRUCE LEHMAN

*Attesting Officer*    *Commissioner of Patents and Trademarks*